(12) United States Patent
Fukazawa

(10) Patent No.: US 7,079,277 B2
(45) Date of Patent: *Jul. 18, 2006

(54) IMAGE FORMING APPARATUS, IMAGE DATA PROCESSING APPARATUS, AND STORAGE MEDIUM

(75) Inventor: Koshi Fukazawa, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 348 days.

This patent is subject to a terminal disclaimer.

(21) Appl. No.: 10/643,927

(22) Filed: Aug. 20, 2003

(65) Prior Publication Data
US 2004/0036910 A1 Feb. 26, 2004

Related U.S. Application Data (63) Continuation of application No. 09/236,539, filed on Jan. 25, 1999, now Pat. No. 6,633,399.

(30) Foreign Application Priority Data
Jan. 30, 1998 (JP) .................................. 10-19711

(51) Int. Cl.
G06F 15/00 (2006.01)
(52) U.S. Cl. .................. 358/1.15; 358/402; 358/407
(58) Field of Classification Search ............... 358/402, 358/407, 468, 1.12, 1.13, 1.14, 1.15
See application file for complete search history.

(56) References Cited

U.S. PATENT DOCUMENTS

| | | | |
|---|---|---|---|
| 5,140,647 A * | 8/1992 | Ise et al. ..................... | 382/284 |
| 5,166,932 A | 11/1992 | Hoff et al. | |
| 5,363,090 A | 11/1994 | Cannon et al. | |
| 5,521,719 A | 5/1996 | Yamada | |
| 5,754,778 A | 5/1998 | Shoujima | |
| 5,805,804 A | 9/1998 | Laursen et al. | |
| 5,983,170 A | 11/1999 | Goodman | |
| 6,101,548 A | 8/2000 | Okada | |
| 6,112,323 A | 8/2000 | Meizlik et al. | |
| 6,219,150 B1 * | 4/2001 | Eguchi ..................... | 358/1.15 |
| 6,253,326 B1 | 6/2001 | Lincke et al. | |
| 6,633,399 B1 * | 10/2003 | Fukazawa ................. | 358/1.15 |

FOREIGN PATENT DOCUMENTS

| EP | EP 1 026 858 A2 | 8/2000 |
|---|---|---|
| JP | A-5-122497 | 5/1993 |
| JP | A-5-284326 | 10/1993 |
| JP | A-10-322506 | 12/1998 |

* cited by examiner

Primary Examiner—Mark Wallerson
(74) Attorney, Agent, or Firm—Oliff & Berridge, PLC (57) ABSTRACT

When received mail contains divided data, the divided data is stored in a RAM until it accumulates a predetermined amount. Then, the predetermined amount of divided mail data is combined to restore the undivided original data file for printing. Accordingly, the original image can be readily restored even from mail data which has been received as a plurality of pieces of mail.

17 Claims, 5 Drawing Sheets

Fig.4 and an overall configuration of a printing system # IMAGE FORMING APPARATUS, IMAGE DATA PROCESSING APPARATUS, AND STORAGE MEDIUM This is a Continuation of application Ser. No. 09/236,539 filed Jan. 25, 1999 now U.S. Pat. No. 6,633,399. The entire disclosure of the prior application is hereby incorporated by reference herein in its entirety.

BACKGROUND OF THE INVENTION

1. Field of Invention

The invention relates to an image forming apparatus which has a special feature of receiving and processing image data divided into a plurality of pieces.

2. Description of Related Art

There have been conventionally provided printers that create print data based on image data received via a communication line, and print an image on a medium, such as paper, corresponding to the created print data. Recent years have seen significant advances in the communications technology, including communication between personal computers using the Internet. Electronic mail (hereinafter referred to as "mail") delivered over the Internet makes transmission and reception of image data very easy. Thus, printers capable of printing image data received over the Internet are conceivable.

A data file in the form of mail and created by converting image data is generally very large. Transmission and reception of such a file as mail will adversely affect the performance of the entire communication system. To reduce the data amount in the file, a technique may be used that divides the image data into a plurality of files to be sent as pieces of mail. In this case, however, a printer, upon receipt of such pieces of mail, forms separate images corresponding to the respective pieces of mail, failing to restore the undivided original image.

More specifically, as mail is delivered via various routes, instead of via a fixed route, the sequence of the divided pieces of image data may be changed, or unrelated mail may be placed between the divided pieces of image data. In this case, it is much more difficult to restore the undivided original image from the received divided pieces of image data.

SUMMARY OF THE INVENTION

In view of the foregoing, an object of the invention is to provide an image forming apparatus capable of readily restoring an undivided or complete original image from divided pieces of image data, which have been transmitted via a communication line.

First, in a preferred embodiment according to the invention, receiving means receives image data transmitted via a communication line. When first judging means judges that the received image data belongs to image data divided into a plurality of pieces, the received image data is stored in storage means. Then, restoration means restores an undivided original image data from the image data stored in the storage means. Finally, print data creation means creates print data based on the restored original image data.

Further, when second judging means judges that the received image data has accumulated to a predetermined amount in the storage means, the restoration means restores the undivided original image data from the stored image data.

In this configuration, because printing is only permitted when image data received as divided pieces of data has accumulated a predetermined amount, restoration of the undivided original image is readily made.

Further, the storage means for storing divided pieces of image data and the restoration means for restoring the undivided original image data are integrated in the image forming apparatus. Accordingly, the restoration of the undivided original image data can be accomplished by the image forming apparatus alone, requiring no operation of a computer connected thereto. Thus, the computer in the communication system is free from the restoration processing, and the performance of the entire communication system is enhanced.

It is noted that a predetermined amount of image data, which initiates printing, can be defined variously. For example, image data for one page or a piece of divided image data can be considered as a predetermined amount. Alternatively, if image data contains character strings indicating a drawing, such as "FIG. 1" and "FIG. 2", and a carriage return mark indicating a paragraph, a block separated by such character strings or a carriage return mark can be a predetermined amount. In addition, the term "image data" used herein means not only data in an image file, such as data transmitted by a fax machine, but also data written in a page description language.

BRIEF DESCRIPTION OF THE DRAWINGS

A preferred embodiment of the invention will be described in detail with reference to the following figures wherein.

DETAILED DESCRIPTION OF PREFERRED EMBODIMENTS

A preferred embodiment of the invention will now be described with reference to the drawings.

Figure 1:
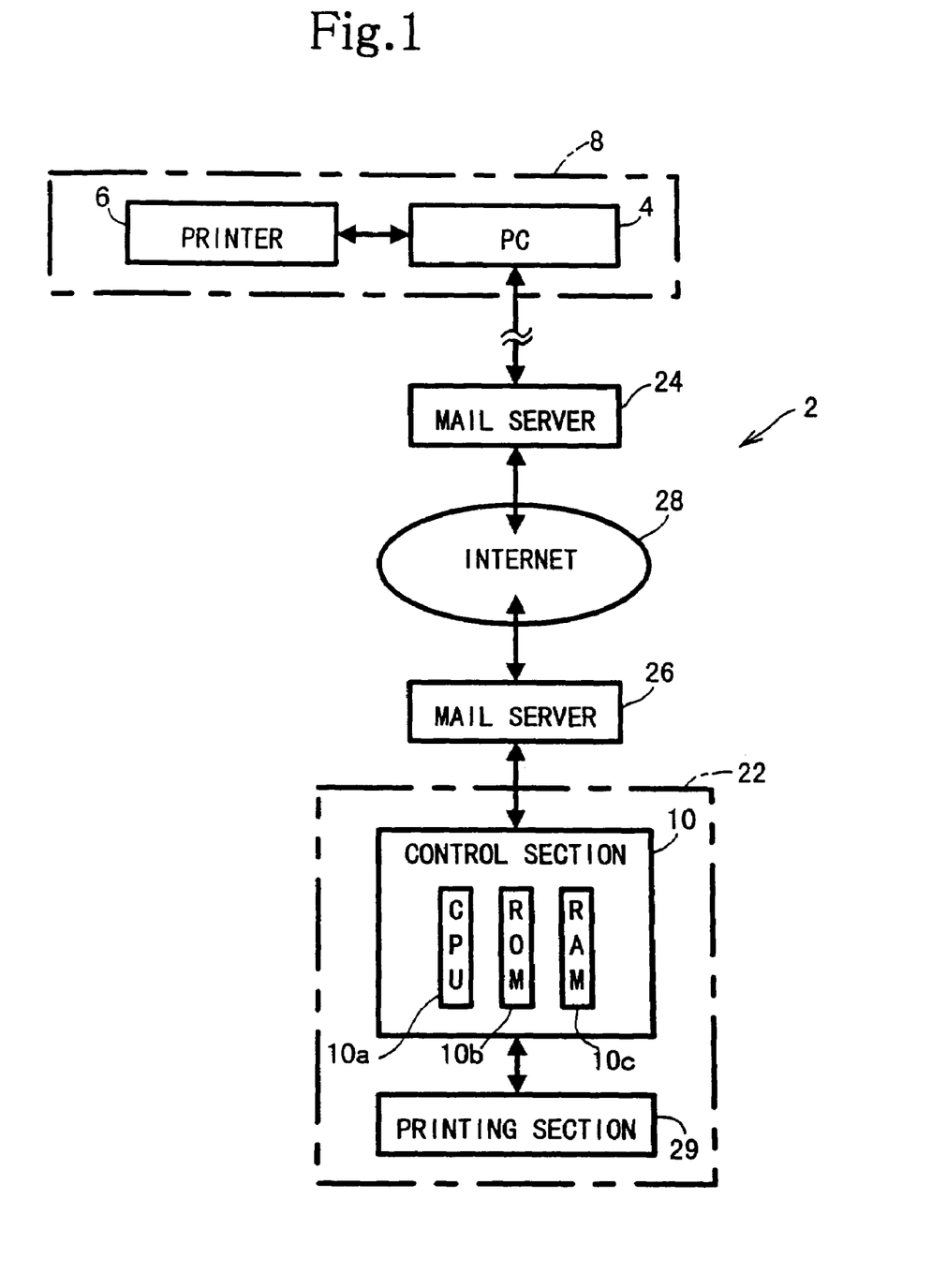
FIG. 1 is a block diagram showing an overall configuration of a printing system according to the invention.

FIG. 1 shows an overall configuration of a printing system 2 to which the invention is applied. As shown in FIG. 1, in the printing system 2, a computer system 8 on the mail transmitting side, which primarily consists of a personal computer 4 (hereinafter referred to as "PC") and a printer 6, and a printer 22, as an image forming apparatus, are connected to the Internet 28 via mail servers 24, 26. The printer 22 includes a printing section 29 for printing an image on a medium, such as paper, and an image data processing apparatus, or control section, 10 for driving the printing section 29 via a printer driver 30, which will be described later. The image data processing apparatus 10 mainly consists of a CPU (Central Processing Unit) 10A, a ROM (Read Only Memory)10B, and a RAM (Random Access Memory) 10C. The mail server 24 is provided by a Internet Service Provider (ISP), while the mail server 26 is connected to the printer 22 disposed in a particular enterprise. In a description given hereinafter, it is assumed that the computer system 8 transmits various types of mail to the Internet 28 via the mail server 24 using the SMTP (Simple Mail Transfer Protocol).

First, an operator in the mail transmitting side operates a mailing software that is run on the PC 4 to transmit ordinary mail in text format. In another case, the operator creates an image he/she wants to transmit to a recipient using application software, such as a word processing program, a spreadsheet program, or a graphics program, and then creates a print file in a desired format from the created image through the printer driver (not shown) integrated into the PC 4. Then, the operator attaches the print file to the mail and transmits it to the recipient using the mailing software.

It is noted that this print file is written in a specified page description language, such as PCL (a registered trademark of Hewlett-Packard Company), PostScript (a registered trademark of Adobe Systems Incorporated) or GDI, which are the de facto standards for printer control language systems. The created image can be confirmed as a printed output when this print file is transmitted to the printer 6 connected to the PC 4.

In order to send a created image using a fax machine to one recipient, and send the same image as mail to another recipient, the operator proceeds as follows. The operator outputs the created image to the fax driver (not shown) where the created image data is converted into a fax data file transmittable by the fax machine. Then, the operator sends the fax data file by attaching it to mail using the mailing software. The fax data file is created in a known format, such as G3 and TIFF.

Further, when there is input from an image scanner (not shown) or a digital camera (not shown) which are connected to the PC 4, image data read from these devices can be converted into a file in a specified standardized format, such as TIFF or JPEG. The file can be transmitted as a file attached to mail.

The image files containing fax data or image data are printed on the printer 22 when they are readable by the printer 22.

If a data file of any type contains image data, it is likely to be so bulky that it takes a long time to transmit the data file. Accordingly, it is inappropriate to transmit such a large data file as one file. In such a case, the operator should divide the data file into a plurality of files and attach identification data representing a state of division, such as ¼, ²⁄₄, ¾, and ⁴⁄₄, to each of the divided files. Dividing the data file and attaching the identification data may be executed automatically by the PC 4.

A divided data file, to which data identified as m/n (hereinafter referred to as "m/n data", m and n natural numbers) is attached, corresponds to a divided piece of image data. All the divided data containing m/n data are preferably in the same format.

When mail is transmitted as described above, the mailing software integrated into the PC 4 requires the operator to enter various required information, including the address of the transmitting-side mail server 24, the SMTP used by the mail server 24, recipient's address, and subject of the mail. Also, the mailing software prepares a mail header according to the information entered. When data files in various formats are transmitted while being attached to mail, an identifier representing the attribute of the attached file(s) is also added to the mail header.

Figure 2:
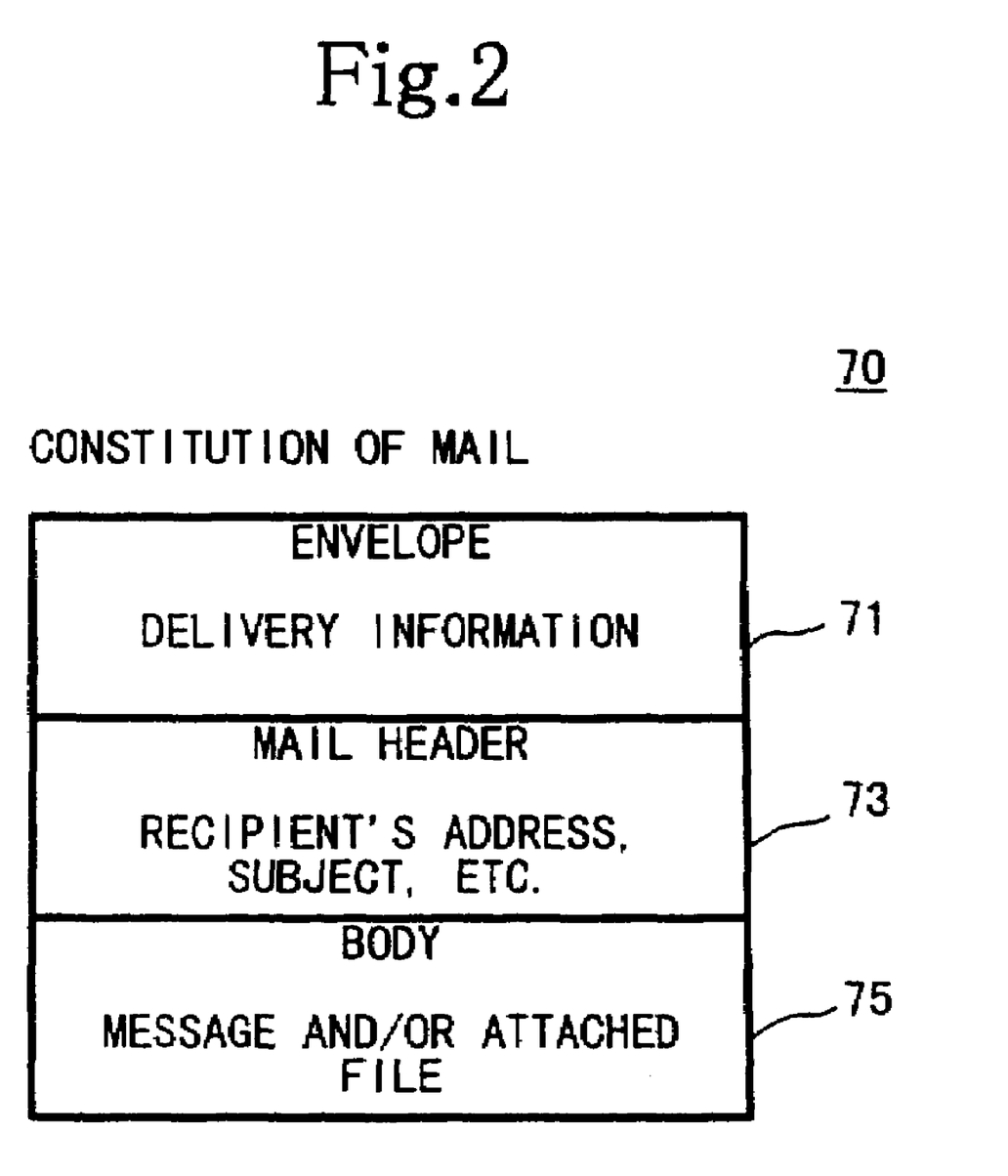
FIG. 2 is a schematic block diagram showing a structure of mail handled by the printing system.

Finally, as shown in FIG. 2, the mailing software creates mail by combining an envelope 71, the mail header 73, and a body 75 containing a message in text format and/or one or more attached files in one or more formats, and transmits the mail to the mail server 24.

At this time, when a data file for an image or character strings spreading over pages are divided into a plurality of files, each of which contains data for one page, data showing the end of each page is also written in the mail header 73. The m/n data is also written in the mail header 73. For example, when a file attached to mail is the second divided file among the four divided files, "²⁄₄" is written in the mail header 73.

Figure 3:
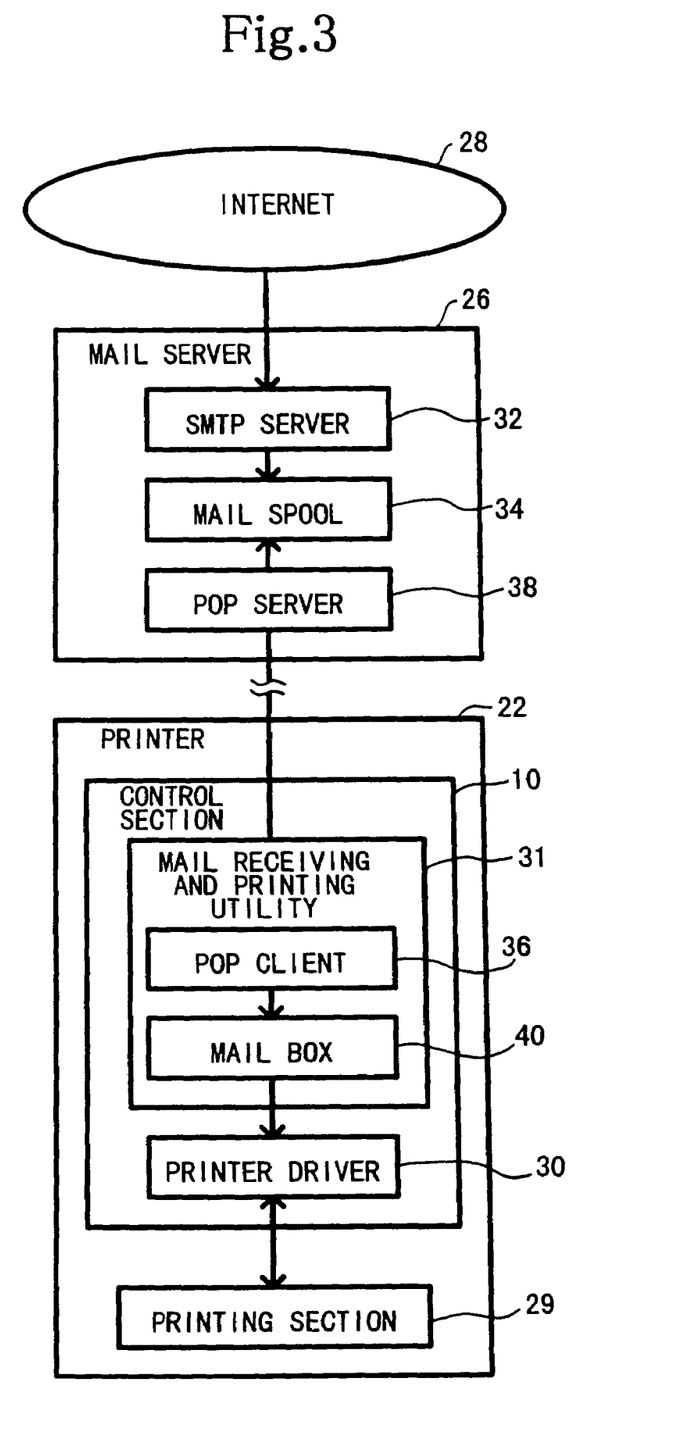
FIG. 3 is a block diagram showing a control sequence for a receiving side of the printing system.

As shown in FIG. 3, mail transmitted in accordance with the SMTP over the Internet 28 is received by a SMTP server 32 of the mail server 26. Mail addressed to the mail server 26 is stored in a mail spool 34, while other mail addressed to other mail servers is transmitted again to the Internet 28.

On the other hand, the printer 22 includes a mail receiving and printing utility 31 and the printer driver 30. The mail receiving and printing utility 31 receives mail from the mail server 26 and directs the printer driver 30 according to the format of the data contained in the mail. The printer driver 30 converts print data written in a particular page description language and fax data into image data that the printing section 29 can process. The printer driver 30 has at least one type of emulation function for analyzing the aforementioned various page description languages and converting it into image data. The printer driver 30 may have a plurality of emulation functions if required. In addition, if processing programs are added to the printer driver 30, it may have a fax emulation function for analyzing fax data and converting it into image data, as well as a conversion function for analyzing the type of compressed image data and converting it into image data.

The image data processing apparatus 10, including the mail receiving and printing utility 31 and the printer driver 30, reserves storage space for managing fonts needed to print text data in the ROM 10b, and another storage space for managing printing forms in the RAM 10c. The mail receiving and printing utility 31 analyzes the mail header 73 of the received mail 70, checks if the received mail contains an attached file(s), and, if so, analyzes the attribute of the attached file(s). Then, the utility 31 directs the print driver 30 according to the results of the analysis.

When the utility 31 judges that the received mail is an ordinary message in text format, the print driver 30, upon receipt of the judgment from the utility 31, converts the text data into image data in a specified format according to a font and a printing form stored in the image data processing apparatus 10, and outputs the image data to the printing section 29.

When the utility 31 judges that the received mail contains an attached file having m/n data, a divided piece of data in such a file is combined with other divided pieces of data, as described next, to restore the original data and output the restored original data to the printing section 29.

Figure 4:
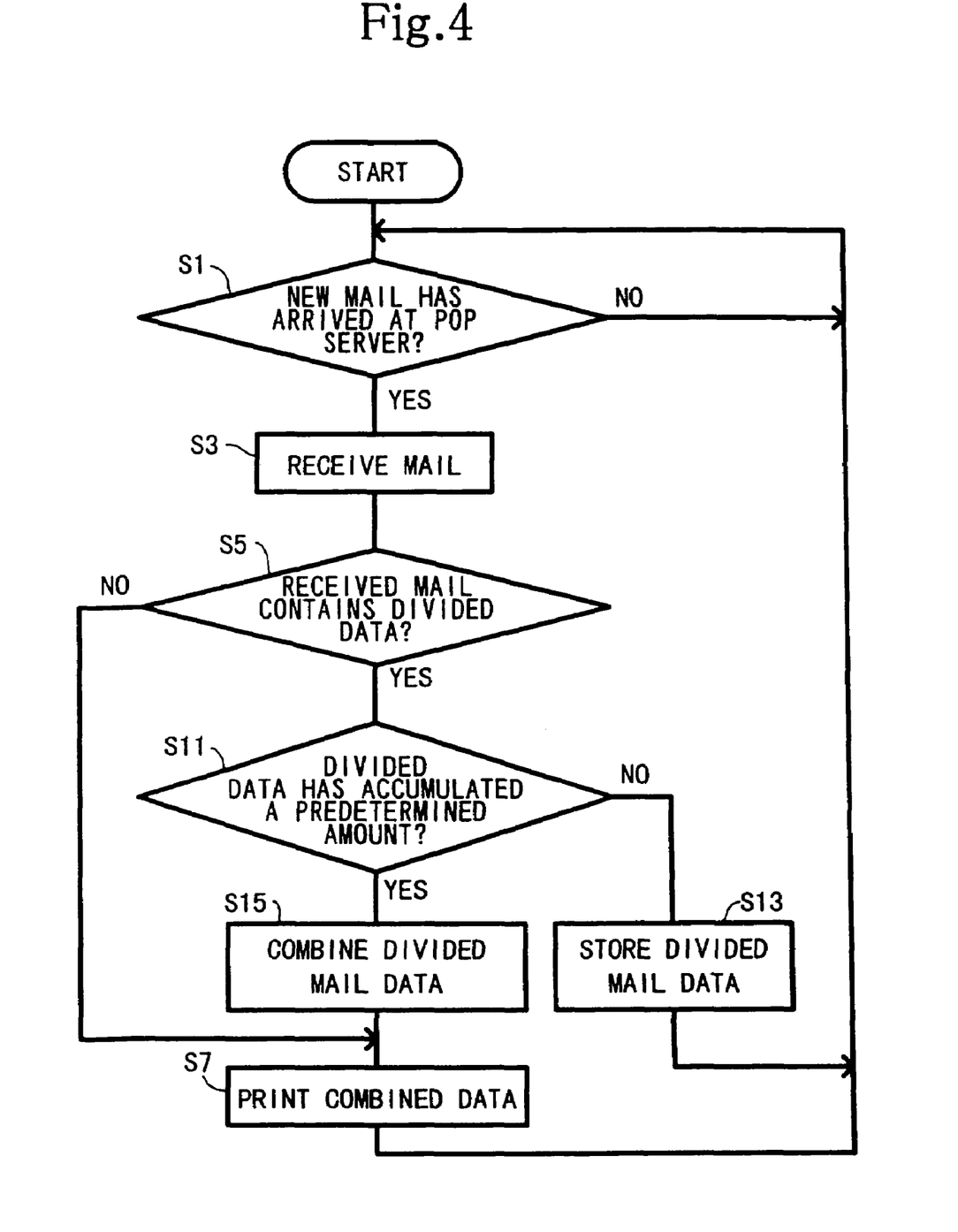
FIG. 4 is a flow chart showing a processing sequence for a mail receiving and printing utility.

With reference next to FIG. 4, there is shown a flow chart that illustrates a processing sequence for the mail receiving and printing utility 31 executed by the image data processing apparatus 10 of the printer 22.

When the process is started, the mail receiving and printing utility 31 executes step S1 and obtains access to a POP (Post Office Protocol) server 38 within the mail server 26 to check if any new mail has arrived. At this time, when there is mail addressed to the printer 22 among mail stored in the mail spool 34, the POP server 38 replies as such to the image data processing apparatus 10.

When new mail has arrived, the process goes to step S3. When no mail has arrived, the process remains at step S1. Step S1 is not necessarily continuously executed, it just needs to be executed at a specified time interval as an interrupt routine. This allows the image data processing apparatus 10 to execute other processes related to the printer 22 during step S1.

When new mail has arrived at the mail server 26 (S1: YES), the printer 22 receives the mail from the mail server 26 at step S3. At step S3, the mail receiving and printing utility 31 makes a request to the POP server 38 within the mail server 26 for mail addressed to a POP client 36. Responding to the request, the POP server 38 transmits applicable mail, according to POP3 (Post Office Protocol, ver.3), from the mail spool 34 to a mail box 40 prepared for the mail receiving and printing utility 31.

At step S5, it is judged whether the mail received at step S3 contains data divided into a plurality of pieces. As previously described, this judgment is made by checking whether m/n data is contained in the mail header 73. When the received mail contains no divided data (step S5: NO), the process goes to step S7, where the printer driver 30 is directed to print an image corresponding to the mail data, as the mail data is already unified, and then returns to step S1. The print driver 30 analyzes the mail data and outputs the print data corresponding the mail data to drive the printing section 29. As a result, the image corresponding to the data contained in the mail received at step S3 is formed on a medium, such as paper.

On the other hand, when the mail received at step S3 contains divided data (step S5: YES), the process goes to step S11, where it is judged whether the divided mail data has accumulated a predetermined amount. This judgment can be made using several references. For example, data for one page, or all the divided pieces of data (i.e. a full set of data from 1/n to n/n) can be defined as a predetermined amount. Alternatively, if a drawing number such as "FIG. 1" and "FIG. 2" or a carriage return mark indicating a paragraph are included in the mail data, a block separated by such a drawing number or a carriage return mark can be the predetermined amount. The reference used for the judgment may be preset, set from an operation panel (not shown), or set automatically depending on the format of an attached file.

When it is judged that the divided mail data has not accumulated the predetermined amount at step S11 (step S11: NO), the process goes to step S13, where the divided mail data is stored in the RAM 10C, and then returns to step S1. When new mail arrives at the POP server 38 (step S1: YES), step S3 and the following steps are executed.

As the above-described steps are repeated, data received at step S3 is added to data stored at step S13, until it reaches the predetermined amount and an affirmative judgment is made at step S11. Then at step S15, the predetermined amount of divided mail data is combined into the undivided original data file, and the process goes to step S7. Finally, an image corresponding to the predetermined amount of mail data is formed on a medium, such as paper.

As described above, the printer 22 keeps storing divided mail data in the RAM 10A until it accumulates a predetermined amount (step S13), and combines the predetermined amount of divided mail data together (step S15) for printing (step S7). This allows the printer 22 to restore the original image readily from the mail data received even though the mail data is received as a plurality of divided pieces of mail. Further, in the preferred embodiment of the invention, the above-described process is executed within the printer 22 without the aid of a computer connected to the printer 22. Accordingly, a computer free from the mail data combining process will enhance the processing efficiency of the entire communication system.

The judgment made, at step S15, as to whether the divided mail data has accumulated a predetermined amount may be altered such that an affirmative judgment is made only when the divided mail data has accumulated a predetermined amount sequentially from the top, i.e. the first divided piece. This is accomplished when an affirmative judgment is made at step S11 for the first time after mail data identified as "1/n" in the mail header has been received. In this case, since an image is printed sequentially from the top according to the mail data, the original image can be restored more easily. In addition, the original image can be readily restored even when a smaller unit amount is used as a predetermined data amount. For example, the original image can be readily restored even when a predetermined length or number of lines of the image is set as a predetermined data amount. This will also reduce the storage capacity required in the RAM 10C, resulting in an efficient reduction of the manufacturing cost of the printer 22.

When two or more unrelated pieces of mail having the same denominator (n) are received, they are likely to be mixed up. To eliminate this problem, an ID code may be added to each piece of mail, and a judgment may be made at step S11 as to whether the mail data having the same ID code has accumulated a predetermined amount. Accordingly, a plurality of unrelated pieces of mail having the same denominator (n) can be distinguished from each another.

In the preferred embodiment of the invention, as described above, the received pieces of mail data are combined together into the undivided original data file when they have been stored in RAM 10C and reach a predetermined amount. Alternatively, the mail data may be stored in the mail spool 34 instead of the RAM 10C.

Figure 5:
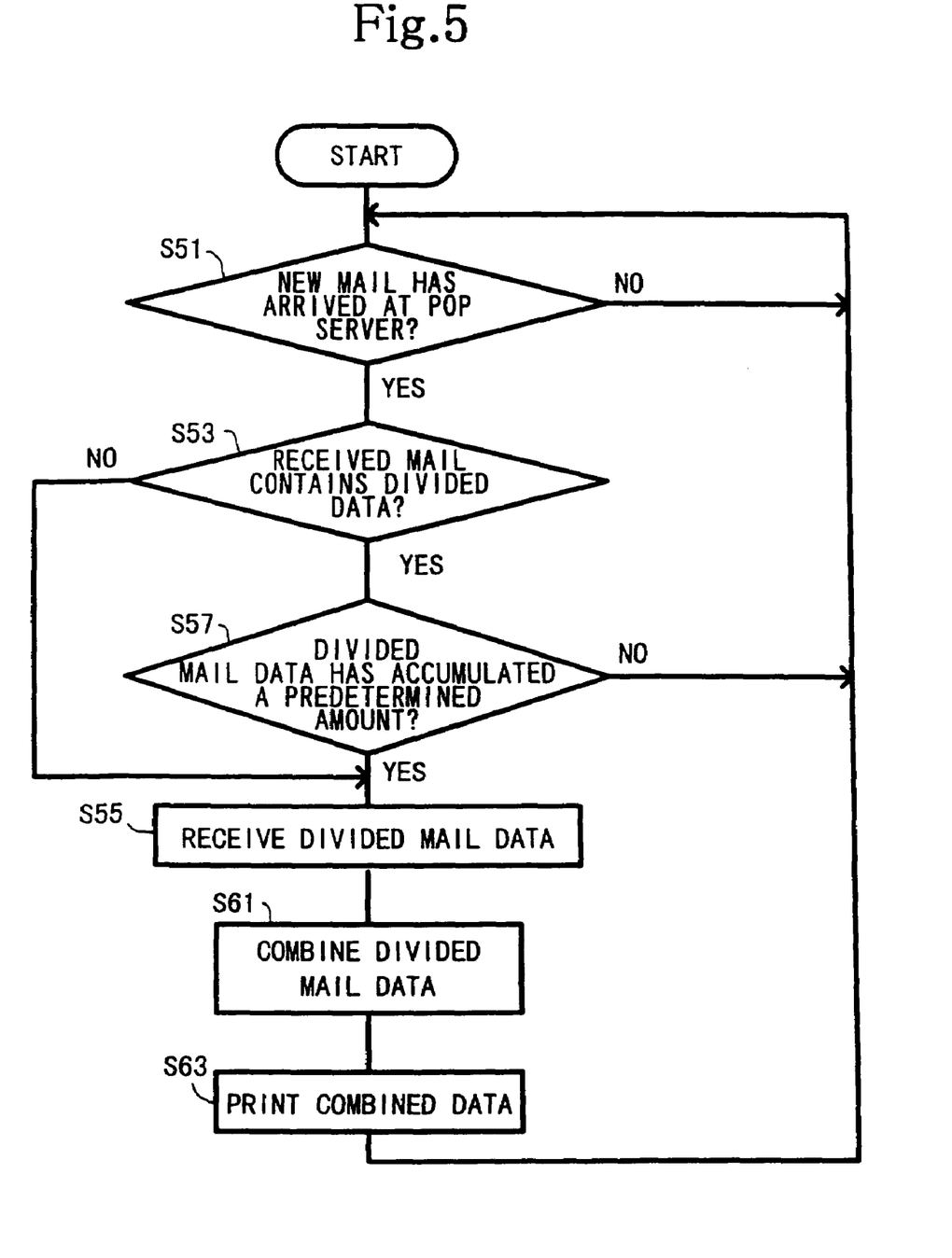
FIG. 5 is a flow chart showing a modified processing sequence for the mail receiving and printing utility.

With reference now to a flow chart shown in FIG. 5, a modified processing sequence for the mail receiving and printing utility 31 will be described.

When the process is started, the mail receiving and printing utility 31 obtains access to the POP server 38 and checks if any new mail has arrived at the mail server 26 at step S51 in the same way as at aforementioned step S1. When no mail has arrived (step S51: NO), the process remains at step S51. When new mail has arrived (step S51: YES), the process goes to step S53, where it is judged whether the mail in the mail server 26 contains data divided into a plurality of pieces. This judgment is made by checking whether m/n data is contained in the mail header 73 of the mail. When the mail in the mail server 26 contains no divided data (step S53: NO), the printer 22 receives the mail at step S51 in the same way as at step S3.

On the other hand, when the mail in the mail spool of the mail sever 26 contains divided data (step S53: YES), it is judged whether the divided mail data has accumulated a predetermined amount in the mail spool 34 (step S57). Steps S51 and S53 are repeated until the divided mail data accumulates the predetermined amount. The judgment at step S57*is* made in the same way as at step S11. When an affirmative judgment (YES) is made at step S57, the process goes to step S55, where the printer 22 receives the predetermined amount of divided mail data.

After step S55, the divided mail data is combined together in the same way as at step S15. When it is judged that the mail in the mail server 26 contains no divided data at step S53, step S61 is effectively skipped as there is no need to combine data, the data being undivided. When the mail data is divided, the mail data is combined at step S61. The mail data is then printed in step S63 on a medium, such as paper, in the same way as at step S7 of FIG. 4.

As described above, the divided mail data is stored in the mail spool 34 until it accumulates a predetermined amount (step S57), and the printer 22 receives the divided mail data when it cumulates the predetermined amount (step S55) and combines the divided mail data to restore the original data file (step S61). Then, according to the restored data file, printing is performed (step S63). Accordingly, the original image can be readily restored from the mail data received even as a plurality of divided pieces of mail.

Further, in the preferred embodiment, the above-described modified process is executed within the printer 22 without aid of a computer connected to the printer 22. Accordingly, a computer free from the mail data combining process will enhance the processing efficiency of the entire communication system.

Further, the mail data is stored until it accumulates the predetermined amount in the mail spool 34, and the printer does not receive the mail data before it accumulates a predetermined amount. This reduces the storage capacity required in the RAM 10C as well as the manufacturing cost of the printer 22.

In the modified processing sequence, the judgment made, at step S57, as to whether the mail data has accumulated a predetermined amount may be altered such that an affirmative judgment is made only when the mail data has accumulated a predetermined amount sequentially from the top, i.e. the first divided piece. This is accomplished when an affirmative judgment is made at step S57 for the first time after mail data identified as "1/n" in the mail header has been received. In this case, since an image is printed sequentially from the top according to the mail data, the original image can be restored more easily. In addition, the original image can be readily restored even when a smaller unit amount is used as a predetermined data amount. For example, the original image can be readily restored even when a predetermined length or number of lines of the image is set as a predetermined data amount. This will further reduce the storage capacity required in the RAM 10C, resulting in an efficient reduction of the manufacturing cost of the printer 22. Also, the amount of mail stored in the mail spool 34 will be reduced, making smoother other communications via the mail server 26.

While a preferred embodiment has been described, such description is for illustrative purpose only, and it will be understood that various changes may be made therein to embody the invention without departing from the spirit of the invention.

For example, while in the above-described embodiment, the program embodying the invention is stored in the ROM 10B and RAM 10C, it may be stored in other memory media, such as a floppy disk, a magnet-optic disk, a hard disk, or a file server on the Internet.

Although, in the above-described embodiment, the mail receiving and printing process is executed by using a program read into the image data processing apparatus 10 of the printer 22, it may be read into a print server which outputs print data to the printer 22 or a PC which is connected to the printer 22. In this case, the print server or the PC receives and combines the divided mail data, and supplies the restored data to the printer 22.

Further, a program used to perform steps S51 to S55 and steps S51 to S61 may be run on the PC or the print server, while another program used to perform steps S61 and step S63, or S63 alone may be run on the image data processing apparatus 10 of the printer 22.

What is claimed is:

1. An image forming apparatus, comprising:

receiving means for receiving data;

first judging means for judging whether the received data belongs to original data divided into a plurality of pieces;

storage means for storing therein the received data when the first judging means judges that the received data belongs to the original data divided into the plurality of pieces;

second judging means for judging whether the data stored in the storage means has accumulated a predetermined amount;

restoration means for restoring the original data divided into the plurality of pieces into undivided original data from the data stored in the storage means, when the second judging means judges that the data stored in the storage means has accumulated the predetermined amount;

print data creation means for creating print data based on the restored undivided original data; and image creation means for creating an image on a medium to be printed according to the print data.

2. The image forming apparatus according to claim 1, wherein the second judging means judges whether the data stored in the storage means has accumulated the predetermined amount sequentially from a first piece of the data divided into the plurality of pieces.

3. The image forming apparatus according to claim 1, further comprising identification means for identifying a code attached to each piece of the data divided into a plurality of pieces to reconstruct the undivided original data.

4. The image forming apparatus according to claim 1, wherein the receiving means for receiving data comprises the restoration means for restoring the data divided into the plurality of pieces into undivided original data from the data stored in the storage means.

5. The image forming apparatus according to claim 1, wherein the receiving means receives the data via an internet.

6. A data processing method for an image forming apparatus, comprising the steps of:

temporarily storing data transmitted via a communication line in a buffer;

first judging whether the data stored in the buffer belongs to original data divided into a plurality of pieces;

second judging whether the data stored in the buffer has accumulated a predetermined amount when the first judging step determines that the data stored in the buffer belongs to the original data divided into the plurality of pieces;

receiving the data stored in the buffer when the second judging step determines that the data stored in the buffer has accumulated the predetermined amount;

restoring undivided original data from the received predetermined amount of data; and creating, based on the restored undivided original data, print data used to drive a printing device to create an image on a medium to be printed.

7. The data processing method according to claim 6, wherein the second judging step determines whether the data stored in the buffer has accumulated the predetermined amount sequentially from a first piece of the data divided into the plurality of pieces.

8. The data processing method according to claim 6, further comprising the step of temporality storing the received predetermined amount of data after the receiving step.

9. The data processing method for an image forming apparatus according to claim 6, wherein the step of restoring undivided original data from the received predetermined amount of data takes place in a device receiving the transmitted data.

10. The data processing method according to claim 6, wherein the data stored in the buffer is transmitted via an internet.

11. A storage medium for storing a program to operate an image forming apparatus, the main program comprising:
a program for receiving data;
a first judging program for judging whether the received data belongs to original data divided into a plurality of pieces;
a program for storing the received data in a buffer when the first judging program judges that the received data belongs to the original data divided into the plurality of pieces;
a second judging program for judging whether the received and stored data has accumulated a predetermined amount;
a program for restoring undivided original data from the data stored in the buffer when the second judging program determines that the received and stored data has accumulated the predetermined amount; and
a program for creating print data based on the restored undivided original data.

12. The storage medium according to claim 11, wherein the second judging program judges whether the accumulated predetermined amount is sequential from a first piece of the original data divided into a plurality of pieces.

13. The storage medium according to claim 11, wherein the program for restoring undivided original data from the data stored in the buffer is executed by a device that receives the received data.

14. The storage medium according to claim 11, wherein the received data is received via an internet.

15. A data transmission and reception system, comprising:
a receiving device that receives data;
a transmitting device that transmits, to a communication line, the data addressed to the receiving device, the receiving device receiving the data via the communication line, wherein:
the transmitting device comprises:
determining means for determining whether the data is to be divided into a plurality of pieces;
dividing means for dividing the data into the plurality of pieces; and
identifying means for identifying each of the plurality of pieces, wherein each piece of the plurality of pieces is provided with an identification code that indicates an original undivided data to which the piece belongs and indicates a placement of the piece for restoration of the original undivided data; and
the receiving device, comprises:
first judging means for judging whether the received data belongs to one of the plurality of pieces;
storage means for storing therein the one of the plurality of pieces;
second judging means for judging whether the stored pieces make-up a predetermined amount;
restoration means for restoring the plurality of pieces into the original undivided data based on the identification code;
print data creation means for creating print data based on the restored undivided original data; and
image creation means for creating an image on a medium according to the print data.

16. The data transmission and reception system according to claim 15, wherein the determining means for determining whether the data is to be divided into a plurality of pieces comprises an operator which instructs the dividing means to divide the data if the operator determines if the data should be divided in order to decrease the time required to transmit the data.

17. The data transmission and reception system according to claim 15, wherein the communication line is an internet.

* * * * *